United States Patent Office 3,798,129
Patented Mar. 19, 1974

3,798,129
PROCESS FOR PRODUCING PARVULINES
Eva Toth-Sarudy, Istvan Horvath, Jozef Gyimesi, Istvan Ott, Laszlo Alfoldi, Janos Berdy, Istvan Koczka, Vilma Scholtz, Valeria Szell, and Eva Laszio nee Tomori, Budapest, Hungary, assignors to Gyogyszerkutato Intezet, Budapest, Hungary
No Drawing. Filed Mar. 8, 1971, Ser. No. 122,173
Int. Cl. C12d 9/00
U.S. Cl. 195—80 R          5 Claims

ABSTRACT OF THE DISCLOSURE

A process for the microbiological production of parvulines, in which Streptomyces parvulus var. parvuli NRRL 5740 (deposited at the National Health Institute, Budapest, Hungary on Oct. 31, 1967, under No. 36) is cultured at aerobic conditions, at 24–32° C. in a medium containing complex proteins, carbohydrates and mineral salts, and the antibiotics accumulated are recovered by extraction.

---

This invention relates to a process for the microbiological production of parvulines for therapeutical as well as animal-feed purposes.

In the past decade a large number of peptide antibiotics has been isolated from different Streptomycetes. The chemical structure of these antibiotics varies to a considerable degree. They contain, besides natural amino acids, amino acids having specific structures and other components, as for instance fatty acids. These substances may be of importance partly because of their therapeutic value and partly for their growth-promoting properties in animals. Many newer antibiotics, not yet applied in therapy, may be considered for this last mentioned purpose.

The aim of the invention is to ensure a process for producing new antibiotics for animal-feed as well as therapeutical purposes.

The invention relates to a process for the microbiological production of parvulines, in which Streptomyces parvulus var. parvuli NRRL 5740 (registered at the National Institute of Health to Budapest on Jan. 31, 1967 under No. 36) is cultured at aerobic conditions in a medium containing complex proteins, carbohydrates and inorganic salts, whereafter the parvulines produced are recovered by extraction and are eventually separated to their respective components.

The antibiotics produced in compliance with the process according to the invention are metabolites of the Actinomycete I-327, isolated from a soil sample in Hungary. The antibiotic may be recovered from the culture broth by the usual separation processes, e.g. extraction. The antibiotic obtained in this way has been designated as parvuline.

A more detailed investigation showed that parvuline was an acidic peptide similar in certain respects to the acidic peptide antibiotics glumamycine (J. Antibiotics, Ser. A, 15, 1–6 (1962), amphomycine (Antibiotics and Chemotherapy, 3, 1239–1242 (1953)), aspartocin (Antibiotics Annual, 1959/1960, 194–198 (1960), and zaomycine (J. Antibiotics, Ser. A, 7, 134–136 (1954)) but may be differentiated from them by its properties to be described later.

The antibiotic-producing strain of the process according to the invention is characterized in compliance with the regulations of the respective chapters of the "Methods Manual" (International Cooperative Project for the Description of Type Cultures of Streptomycetes), Delaware, Ohio, 1964 and of Hütter, R.: "Systematik der Streptomycetes," Basel, 1967, as follows.

Micromorphology.—The sporephores consist of multiple, loose spirals with oval-shaped spores; their number is maximum 50, minimum 2–3. The percentage ratio of the spirals in different media varies. For instance on oatmeal agar: rectus flexibilis 1–2%, retinaculum 10%, and spira 88%; on inorganic salt-starch agar: rectus flexibilis 5%, retinaculum 50% and spira 45%; on yeast extract-malate agar: no real coils, only loose elongated retinaculum-type formations may be observed with certain transitions in the direction of flexibilis and rectus. No globular sporangia, spore flagellae or substrate-mycelium fragmentation can be observed. The surface of the spores is smooth.

Characteristics of the cultures.—Neither the color of the substrate-mycelium nor that of the soluble pigment has indicator properties. No melanin production (chromogenicity reaction) was observed either on peptone-yeast-extract-iron agar or on tyrosine agar. A very strong nitrate reduction was produced in Bactonitrate liquid culture by the seventh day.

Yeast-extract malate-extract agar.—Abundant, gray aerial mycelium: on the seventh day "d" (light gray), after the 14th day "3 fe" (light brownish-gray). The substrate-mycelium is yellowish-brown, on the 14th day "Co 40." No soluble pigment or sometimes light yellow traces.

Oatmeal-agar.—Abundant, gray aerial mycelium: "2 fe" (moderately gray), later "3 fe." The substrate-mycelium is yellowish-brown: "Co 38." No soluble pigment.

Glycerol-asparagine-agar.—Poorly developed aerial mycelium, detectable only in traces. The substrate-mycelium yellowish-brown "Co 38," no soluble pigment.

Potato agar.—Abundant, gray aerial mycelium, powder-like. Substrate-mycelium moderately developed, strongly wrinkled, light brown. No soluble pigment.

Gauze's starch agar.—Developed aerial mycelium, gray, powder-like. Poorly developed, colorless, later faint yellow veil-like substrate-mycelium. No soluble pigment.

Glucose-agar.—Poorly developed, grayish-white, powder-like aerial mycelium, moderately developed, colorless, wrinkled substrate-mycelium. No soluble pigment.

Glucose-asparagine-agar.—Aerial mycelium in traces. Poorly developed, colorless, veil-like substrate-mycelium. No soluble pigment.

Glycerol-asparagine-agar.—Poorly developed, powder-like, grayish-white aerial mycelium, poorly developed light yellow veil-like substrate-mycelium. No soluble pigment.

Glycerol-glycin-agar.—Aerial mycelium in traces. Moderately developed, light yellowish-brown, faintly wrinkled, veil-like substrate-mycelium. No soluble pigment.

Glycerol-urea-agar.—Aerial mycelium in traces. Moderately developed, colorless, later light brown, wrinkled, veil-like substrate mycelium. No soluble pigment.

Starch-casein-agar.—No aerial mycelium. Moderately developed, colorless, veil-like substrate mycelium. No soluble pigment.

"Nähr"-agar.—Poorly developed, whitish-gray, powder-like aerial mycelium. Moderately developed, light-yellow, veil-like substrate-mycelium. No soluble pigment.

Saccharose - nitrate-agar.—Poorly developed, powder-like grayish aerial mycelium; poorly developed, colorless, veil-like substrate-mycelium. No soluble pigment.

Synthetic agar.—Aerial mycelium in traces. Abundant, light-brown, wrinkled substrate-mycelium. Intensive light brown soluble pigment.

Trypton-yeast-extract-agar.—Poorly developed, light gray aerial mycelium. Scanty, colorless, veil-like substrate-mycelium. No soluble pigment.

Inorganic salt-starch-agar.—Moderately developed, gray aerial mycelium "2 fe" during the entire culturing period. Substrate-mycelium yellowish-brown, on the seventh day "Co 40." No soluble pigment.

Carbon-source utilization spectrum on synthetic Pridham and Gottlieb medium:

−=no growth, no utilization;
±=growth in traces;
+=poor growth;
++=moderate growth;
+++=abundant growth;
positive control (d-glucose): positive (+++);
negative control (devoid of C): negative (−);

l-arabinose (+++) positive; d-fructose (+++) positive; d-mannitol (+++) positive; raffinose (−) negative; rhamnose (+++) positive; saccarose (±) negative; d-xylose (+++) positive; d-galactose (+++) positive; maltose (+++) positive; melibiose; (±) negative; inuline (−) negative; dulcitol (−) negative; salicin (+) faintly positive; d-sorbitol (±) negative; melicitose (+) negative; adonite (±) negative; trehalose (+++) positive; line (−) negative; dulcitol (−) negative; salicin (+)

Based on the above description, *Streptomyces parvulus* I–327 may be considered a new variant of *Streptomyces parvulus* and has been designated *Streptomyces parvulus* var. *parvuli*.

According to the bibliographic data (Hütter, R.: "Systematik der Streptomycetes," Basel, 1967) no *Streptomyces parvulus* species was ever utilized for the production of antibiotics similar to the antibiotic of the present invention.

*Streptomyces parvulus* may be cultered according to the methods generally utilized for fermentations with Actinomycetes. As a carbon source glucose or lactose can be most advantageously applied. Soya meal, corn-steep-liquor, nutmeal, or casein can be utilized as N source. NaCl, CaCO$_3$ etc. can be used as mineral salts.

The strain can be maintained on potato-extract-glucose-agar. Its productivity can be advantageously influenced by means of ultraviolet irradiation on antibiotic-containing medium.

Parvulin may be produced at any temperature where *Streptomyces parvulus* var. *parvuli* attains sufficient growth (24–32° C.). It is preferable, however, to maintain the temperature between 26° C. and 30° C. The culture medium should ge sterilized at 120–125° C. for 20–45 minutes.

The air flow is preferably 0.7 to 1.2 and more preferably 0.8 to 1.2 lit./lit./min. through the culture medium.

The pH should be 7.0 before sterilization. The sterile culture medium is inoculated by a spore suspension or vgetative inoculum of *Streptomyces parvulus* var. *parvuli*. The medium utilized for vegetative inoculum is identical to that of the fermentation itself.

The amount of inoculum in the tank fermentation is 5 to 10% of the medium to be inoculated.

In the course of fermentation the antibiotic content attains 400–600 γ/ml. in the 48th hour. In the 70th–72nd hour a fragmentation of 5–10% may be observed beside poor sporulation. The biological activity of the broth amounts to 1000–1400 γ/ml. Parallel to glucose consumption the pH is constantly rising. To enhance antibiotic production it is advisable to add further glucose to the medium. The antibiotic content may attain 1800–2100 γ/ml. Further production is effected by the second generation of the microorganism. The maximal antibiotic level may be reached in the 120th hour: 2400–2600 γ/ml. In the microscopic picture 40–50% fragmentation, stiffness of mycelia and sporulation may be observed. The pH raises to 7.6–8.1.

When filtering the broth at pH 3.2–3.6, the antibiotic is in the mycelium and can be recovered by extraction. The extraction of the wet mycelium can be performed by water-miscible or at least partly miscible organic solvents, as for instance alcohols (methanol, ethanol, butanol, etc.) or acetone.

After evaporating the extract, the antibiotic can be precipitated from the residue with a slightly polar solvent: ethyl acetate, ether or acetone. The acidic parvuline can be extracted in the form of its salt at pH values of from 7 to 9 from its butanolic solution into water, and at pH values of from 3.4 to 3.6 corresponding to its isoelectric point, again into the organic phase in its free acidic form. The multiple repetition of these extraction-reextraction steps can be successfully applied in the purification of parvuline.

Parvuline can be precipitated from aqueous solutions in the form of its salts insoluble in water. By the addition of CaCl$_2$ or Pb(CH$_3$COO)$_2$ its Ca or Pb salt is formed. Similarly its Ag salt and salt with various other metals can be isolated.

Parvuline, produced and purified by the above described methods, is not a uniform substance, as demonstrated by a 440 step Craig chromatographic distribution (CCD) performed in chloroform-methanol-0.02 N HCl (2:2:1) or sec. butanol-ethylacetate-methanol-pH=3.5 buffer solution (2:8:3:7) system, resp., and by chromatographic investigations as well. The individual components can be separated by adsorption chromatography on a silica gel column employing a solvent system of chloroform-methanol where the percentage of methanol is constantly raised in the course of chromatography. Parvuline can be separated to its components named A, B, and C, their ratio being 6:1:1. Consequently, parvuline contains, beside its main component A, two similar peptide-like, biologically active components in smaller amounts.

The quanitative and qualitative amino acid content of the individual components (hydrolysis executed in 6 N HCl at 110° C. for 16 hours) is the following:

Parvuline A.—Aspartic acid (4), glycine (3), proline (1), valine (2), pipecolic acid (1), α,β-diaminobutyric acid (2).

Parvuline B.—Aspartic acid (4), glycine (2), proline (1), valine (1), pipecolic acid (1), α,β-diaminobutyric acid (1).

Parvuline C.—Aspartic acid (4), glycine (1), proline (1), pipecolic acid (2), α,β-diaminobutyric acid (2).

Component C is devoid of valine. All three components contain a non-identified amino acil, furthermore, 12–13 C fatty acids.

Elementary analysis data of the individual components:

| Parvuline A— | Percent |
|---|---|
| C | 50.99–51.20 |
| H | 7.50–7.55 |
| N | 12.03–12.21 |
| Parvuline B— | |
| C | 48.92–49.05 |
| H | 7.21–7.43 |
| N | 9.95–10.17 |
| Parvuline C— | |
| C | 51.22–51.30 |
| H | 7.78–7.80 |
| N | 10.96–11.00 |

The antibacterial activity of the parvuline complex is as follows:

| | Minimum inhibitory concentration, γ/ml. |
|---|---|
| *Staphylococcus aureus* 53 [1] | 6 |
| *Staphylococcus aureus* 80/81 [1] | 6 |
| *Staphylococcus aureus* 1115 [2] | 6 |
| *Staphylococcus aureus* Duncan | 6 |
| *Sarcina lutea* | 0.8 |
| *Bacillus subtilis* ATTC 6633 | 0.8 |
| *Streptococcus faecalis* | 50 |
| *Pseudomonas pyocyaneus* | 100–1000 |
| *E. voli* 0111 | 100–1000 |
| *E. coli* 6R | 100–1000 |
| *Candida albicans* | Inactive |

[1] Polyresistant (resistant against penicillins, streptomycins and polymyxins).
[2] Penicillin-resistant.

The microbiological activity of the individual components does not vary significantly.

The intraperitoneal toxicity of parvuline on CBA mice: $LD_{50}=300$ mg./kg.

The following examples are illustrative of the process according to the invention.

EXAMPLE 1

Culturing medium placed in five 500 ml. Erlenmeyer flasks was inoculated with the spore suspension of *Streptomyces parvulus* var. *parvuli* (the spores were grown on potatoe-glucose-agar in the usual manner). Culturing medium:

| | Percent |
|---|---|
| Soya meal | 2.0 |
| Casein (dry material content 10%) | 1.0 |
| Corn-steep liquor (dry material 50%) | 0.2 |
| Glucose | 3.0 |
| NaCl | 0.3 |
| $CaCO_3$ | 0.5 | pH before sterilization: 6.9–7.0.

The culturing was performed at 28° C. The fermentation attained in the 46–54th hour an antibiotic content of 500 γ/ml. The assay was carried out microbiologically at pH=8, test organism: *Bacillus subtilis* ATTC 6633, in the usual manner (I. Horvath and Gy. Wix.:Acta Physiol. Hung., 4, 435 (1953). The cultures may be stored for 9–10 days at −14—−16° C. without losing their producing capacity.

EXAMPLE 2

A 100 litres tank fermentor was inoculated with the spore suspension of *Streptomyces parvulus* var. *parvuli* (I-327). Culture medium in the fermentor:

| | Percent |
|---|---|
| Soya meal | 2.0 |
| Casein (dry material 10%) | 1.0 |
| Corn-steep liquor (dry material 50%) | 0.2 |
| Glucose | 4.0 |
| NaCl | 0.3 |
| $CaCO_3$ | 0.5 |

Boiled together with 0.3% palm oil as antifoam agent. pH 6.5–7.0 before sterilization.

Sterilization was carried out at 121° C. for 30 minutes. Glucose was sterilized separately. Air flow: 100 lit./min.; rotation of the stirrer: 250 r.p.m.; fermentation temperature: 26–30° C., optimum: 28° C. After 48 hours of culturing, the broth was transferred in a 1000 litres fermentor with inoculum of max. 5 to 10%. The medium and pH of this fermentor were identical with those enlisted above.

Specification of the fermentation:

Air-flow: 700–800 lit./min.; rotation of the stirrer: 270 r.p.m.; temperature: 26–30° C. (preferably 28° C.). The antibiotic content was 1800–2100 γ/ml. in the 96th hour. The maximum antibiotic level (2400–2600 γ/ml.) can be attained in the 120th hour.

EXAMPLE 3

100 litres of fermentation broth, antibiotic content 1000 γ/ml., were acidified with an aqueous oxalic-acid solution to pH 3.4–3.6 and filtered. The antibiotic was extracted from the mycelium with twice its weight of acetone. The acetone extract was concentrated at reduced pressure to one tenth of its volume. The aqueous residue was extracted at pH 3.3–3.6 with ⅓ its volume of butanol. From this butanolic extract parvuline was reextracted twice with ⅕ its volume of sodium hydrogen carbonate solution. After acidification to pH 3.3–3.6, the antibiotic was transferred into one-third its volume of butanol. The butanolic solution was evaporated in vacuo. The antibiotic was precipitated from the residue with ethyl acetate. Yield: 52%.

EXAMPLE 4

1000 litres of fermentation beer with an antibiotic content of 1500 γ/ml. were filtered at pH 3.4. The antibiotic was extracted from the mycelium with twice its weight of methanol, and concentrated to one tenth of its volume at reduced pressure. The aqueous residue was neutralized with saturated sodium hydrogen carbonate solution to pH=7 and mixed by constant stirring with a calcium chloride solution (25 ml. saturated $CaCl_2$ solution to one litre of residue). The precipitated calcium salt was filtered, washed with water, subsequently with acetone and then dried. Weight of parvuline-Ca salt: 1620 g. (antibiotic content: 50%). Yield: 54%.

EXAMPLE 5

20 g. of the antibiotic complex, isolated and purified according to Example 3, were separated to components by means of adsorption chromatography on a silica gel column. The column was prepared from 1 kg. of silica gel (Silica Gel Koch Light Laboratories, Ltd., 100/200 mesh). 200 fractions, 350 ml. each, were collected. The elution was started with chloroform containing 10% of methanol and continued by raising its methanol content by 5% each up to 50%, where the chromatography was finished. By working up the fractions, 3.9 g. of parvuline A, the main component, furthermore 1.6 g. of parvuline B and 1.8 g. of parvuline C were obtained, beside about 4.8 g. of a mixture of parvuline A and B. Yield: 60.5%.

What we claim is:

1. A process for the microbiological production of parvulines which comprises culturing at aerobic conditions in a medium containing complex proteins, carbohydrates and mineral salts *Streptomyces parvulus* var. *parvuli* NRRL 5740 and recovering by extraction the accumulated antibiotics.

2. A process according to claim 1, in which soya-meal, corn-steep liquor, nut-meal or casein hydrolysate are used as complex protein source, glucose or lactose as carbohydrates and NaCl or $CaCO_3$ as inorganic salt.

3. A process according to claim 1, in which the fermentation is carried out at 24–32° C., at an air-flow of 0.1–1.2 lit./lit./min.

4. A process according to claim 1, in which the fermentation liquid is filtered at pH 3.2–3.6, and the antibiotics are extracted from the mycelium with a polar organic solvent.

5. A process according to claim 1, in which the parvulines are separated to their respective components by means of adsorption chromatography on a silica gel column.

References Cited

Miller: "The Pfizer Handbook of Microbial Metabolites," 1961, McGraw-Hill, New York, pp. 381–384.

Chemical Abstracts, vol. 49, 1955, 11776c.

JOSEPH M. GOLIAN, Primary Examiner